United States Patent
Shaw et al.

(10) Patent No.: US 10,405,295 B2
(45) Date of Patent: Sep. 3, 2019

(54) DYNAMIC NETWORK CONFIGURATION BASED ON PASSIVE LOCATION ANALYTICS

(71) Applicant: AT&T Intellectual Property I, L. P., Atlanta, GA (US)

(72) Inventors: Venson Shaw, Kirkland, WA (US); Jin He, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 205 days.

(21) Appl. No.: 15/436,734

(22) Filed: Feb. 17, 2017

(65) Prior Publication Data
US 2017/0164322 A1 Jun. 8, 2017

Related U.S. Application Data

(63) Continuation of application No. 14/102,056, filed on Dec. 10, 2013, now Pat. No. 9,591,603.

(51) Int. Cl.
*H04W 64/00* (2009.01)
*G01S 5/02* (2010.01)
*H04W 16/10* (2009.01)

(52) U.S. Cl.
CPC ......... *H04W 64/006* (2013.01); *G01S 5/0263* (2013.01); *H04W 16/10* (2013.01); *H04W 64/00* (2013.01)

(58) Field of Classification Search
CPC ... H04W 64/006; H04W 16/10; H04W 64/00; G01S 5/0263
See application file for complete search history.

(56) References Cited

U.S. PATENT DOCUMENTS

| | | | |
|---|---|---|---|
| 7,558,585 B2 | 7/2009 | Laiho et al. | |
| 7,706,814 B2 | 4/2010 | Sillasto et al. | |
| 8,073,463 B2 | 12/2011 | Islam et al. | |
| 8,270,969 B1* | 9/2012 | Khanka | H04W 48/16 370/332 |
| 8,838,156 B2 | 9/2014 | Tine et al. | |
| 2003/0162539 A1* | 8/2003 | Fiut | H04W 24/00 455/424 |

(Continued)

OTHER PUBLICATIONS

Pages-Zamora, et al. "Evaluation of the improvement in the position estimate accuracy of UMTS mobiles with hybrid positioning techniques." IEEE 55th Vehicular Technology Conference, Spring 2002. vol. 4. 5 pages.

(Continued)

*Primary Examiner* — Lester G Kincaid
*Assistant Examiner* — Majid Syed
(74) *Attorney, Agent, or Firm* — Amin, Turocy & Watson, LLP

(57) ABSTRACT

Passive location estimation of mobile devices within a wireless network is provided. The passive location estimation is determined based on one or more measurements that are received from the mobile device and/or from one or more network elements. At least a portion of the passive information can be received in user plane data associated with an application executing on the mobile device. A measurement set for the mobile device can be defined and can be used to build fingerprints of geographical cellular measurements.

20 Claims, 13 Drawing Sheets

(56) References Cited

U.S. PATENT DOCUMENTS

| | | | |
|---|---|---|---|
| 2008/0032677 A1* | 2/2008 | Catovic | H04W 72/02 |
| | | | 455/414.1 |
| 2012/0040693 A1 | 2/2012 | Wigren et al. | |
| 2012/0120938 A1 | 5/2012 | Mueck et al. | |
| 2012/0252491 A1 | 10/2012 | Degtyar et al. | |
| 2012/0306691 A1 | 12/2012 | Werner | |
| 2012/0306692 A1* | 12/2012 | Werner | G01S 19/09 |
| | | | 342/357.29 |
| 2013/0122929 A1 | 5/2013 | Al-Mufti et al. | |
| 2013/0260749 A1 | 10/2013 | Annamalai | |
| 2013/0271324 A1 | 10/2013 | Sendonaris | |
| 2014/0171105 A1 | 6/2014 | Al-Mufti et al. | |

OTHER PUBLICATIONS

Gundlegard, et al. "Cellular Positioning Using Fingerprinting Based on Observed Time Differences." 2013 International Conference on Smart Communications in Network Technologies (SaCoNeT), Jun. 17-19, 2013, published online at [http://liu.diva-portal.org/smash/record.jsf?pid=diva2:636342], 7 pages.
Non-Final Office Action for U.S. Appl. No. 14/102,056, dated Apr. 23, 2015, 39 pages.
Final Office Action for U.S. Appl. No. 14/102,056, dated Sep. 1, 2015, 37 pages.
Radio-Subsystem-Synchronization, GSM Technical Specification GSM 05.01, May 1996, 15 pages.
Non-Final Office Action for U.S. Appl. No. 14/102,056, dated May 19, 2016, 49 pages.
Notice of Allowance for U.S. Appl. No. 14/102,056, dated Oct. 21, 2016, 10 pages.

* cited by examiner ically relies on timing advance measurements, but this information is not very accurate because timing advance is a measurement of the distance between the user equipment device and the base station along a radius.

DYNAMIC NETWORK CONFIGURATION BASED ON PASSIVE LOCATION ANALYTICS

RELATED APPLICATION

The subject application is a continuation of, and claims priority to, U.S. patent application Ser. No. 14/102,056, filed Dec. 10, 2013, and entitled "DYNAMIC NETWORK CONFIGURATION BASED ON PASSIVE LOCATION ANALYTICS", the entirety of which application is hereby incorporated by reference herein.

TECHNICAL FIELD

The subject disclosure relates to wireless communications and, also generally, to dynamic network configuration based on passive location analytics.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls and poor communication have been blamed for user dissatisfaction. On the network side, instances of dropped calls and poor communication can occur due to variations in coverage capacity and performance, as well as inaccuracies associated with determining the location where the coverage capacity and performance has degraded.

BRIEF DESCRIPTION OF THE DRAWINGS

Various non-limiting embodiments are further described with reference to the accompanying drawings in which.

DETAILED DESCRIPTION

Figure 1:
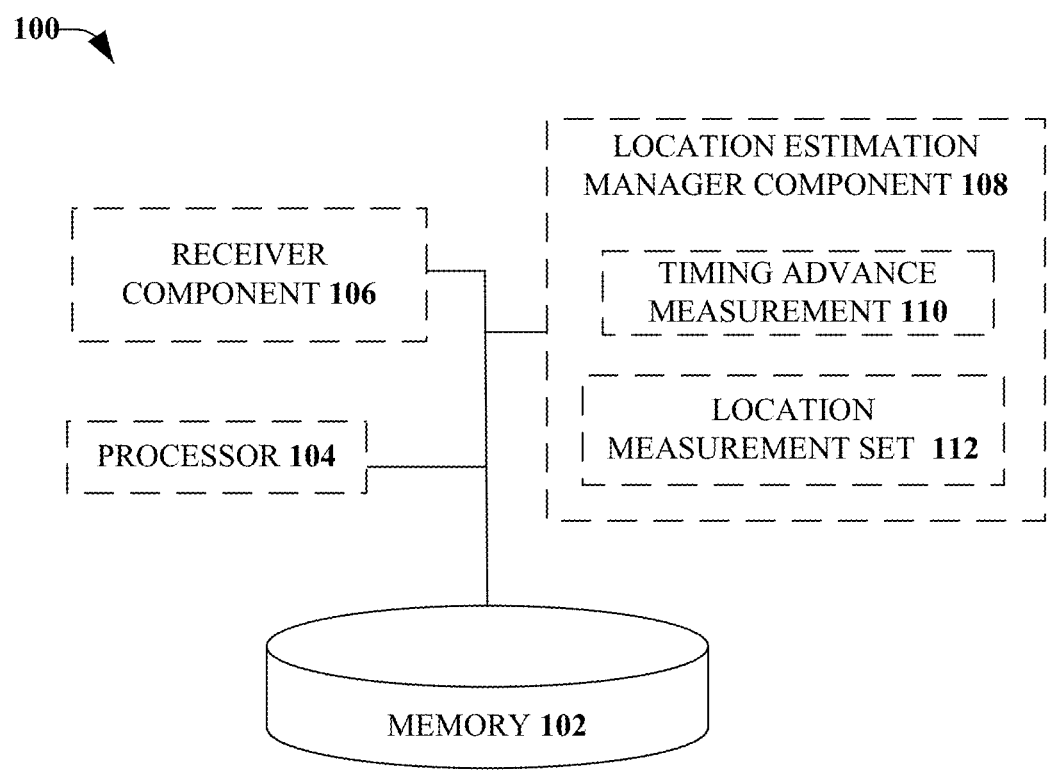
FIG. 1 illustrates an example, non-limiting system for performing passive user equipment device localization, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various aspects discussed herein relate to a hybrid approach for passive user equipment localization for wireless networks using various information and measurements that are obtained passively from user equipment devices. Passive user equipment localization is distinguishable from active equipment localization based on the involvement of the user equipment device. According to passive equipment localization, as discussed herein, one or more network devices collect measurements and associated time stamp information from certain user equipment devices within the network, and perform the localization. The user equipment device(s) are just sending measurements, but as discussed herein, there is no user equipment device and/or user intervention. Instead, the network monitors and collects the data. In contrast, active location estimation approaches use a trigger from the network side. For example, a network device might send a command to the user equipment device and the user equipment device performs the localization, interacts with one or more network devices or network elements, and feeds back the location estimate to the network device that requested the measurement information.

The information received from the user equipment device, according to an aspect, can include timing advance values and global positioning system (GPS) measurements. A timing advance value relates to the length of time it takes for a signal to travel from a user equipment device to a base station (e.g., over an uplink). The passive user equipment localization can be determined based on information and/or various measurements that are received from the user equipment device for other reasons (e.g., call handling, mobility handling, radio resource handing, or various other wireless network operations). Since this information and/or measurements are being reported for other purposes, the information and/or measurements can be leveraged and used to perform the user equipment localization, with minimal, if any, impact to the user equipment device.

In wireless communications networks, for customers that report service issues, it is important to determine the location where the service issue was observed. Therefore, the location information should be as accurate as possible. However, the quality of current passive location estimate approaches for wireless communications networks is too poor to meet the requirements for operators (and others) to perform good radio network coverage and capacity optimization. Currently, network operators passively calculate the user equipment device locations for all user equipment devices in all places within the network. However, such approaches do not scale to all user equipment devices at the same time.

The disclosed aspects generally relate to locating network equipment (e.g., user equipment devices) for the purpose of network management and/or for providing network services. Further, the disclosed aspects relate to measuring a spatial relationship of a user equipment device with respect to one or more reference points. More specifically, the disclosed aspects relate to a hybrid approach for passive user equipment device location estimation (e.g., determining a position of the user equipment device) for a wireless communications network using cellular uplink timing advance and GPS measurements.

In an embodiment, a measurement set is defined as a set of measurements from the user equipment device, which can include GPS measurements, including latitude, longitude, altitude, and/or speed. On the cellular network side, timing advance measurements and reference signal received power/reference signal received quality (RSRP/RSRQ) measurements are obtained from the serving cell and the neighboring cell(s). Each measurement set can be associated with the appropriate mobile device and a measurement window (e.g., a defined amount of time). A complete reference measurement set includes timing advance measurements, RSRP/RSRQ measurements, and GPS measurements. A partial reference measurement set includes at least GPS measurements, if no other measurements are available. The available complete and partial reference measurement sets can be utilized to build fingerprints of geographical cellular measurements.

According to an embodiment, to calculate a user equipment device timestamp/location that does not fall into any reference measurement set when the user equipment device is radio resource control (RCC) connected, a shorted weighted Euclidean distance estimate can be used to estimate the user equipment device location. The weights are on timing advance measurements and RSRP/RSRQ measurements. The GPS location of a reference measurement set that has the shortest weighted Euclidean distance to the non-reference measurement set can be used as the estimate of the user equipment device's location.

In another embodiment, if the user equipment device is performing a handover and there is no reference measurement set or reference fingerprint that can be used, a timing advance measurement and handover based approach can be used to estimate the user equipment device location. For example, when the user equipment device is moving left to right during a handover, the left cell reports the user equipment device's timing advance measurements before the handover and the right cell reports the user equipment device's timing advance measurements after the handover. The distance of the user equipment device to the left cell ("Dl") is calculated from the last timing advance left cell measurements for the user equipment device. The distance of the user equipment device to the right cell ("Dr") is calculated from the first timing advance right cell measurements for the user equipment device. The distance between the two cells is defined as "D". A calculated relationship between "Dl", "Dr", and "D" can result in determining the user equipment device is located on a line between the antennas of the two cells and at what distance from the left cell antenna. In other cases, the relationship indicates that the user equipment device is located on one of two intersection locations. In this case, the RSRP/RSRQ measurements can be used to determine which intersection of the two intersections is the more likely location. If needed, the timing advance measurements before and after the handover can be used to calculate an estimated azimuth.

FIG. 1 illustrates an example, non-limiting system 100 for performing passive user equipment device localization, according to an aspect. The disclosed aspects can be configured to collect passive information from a user equipment device for location estimation. Since the information is collective passively from the user equipment device, there is no impact to the user equipment device. Further, there can be minimized impact to a radio access network (RAN) and core network since the collected information can be transported through an operations, administration, and management (OAM) network with manageable bandwidth, according to an implementation.

Further, the disclosed aspects can be configured to perform the location estimation with a relatively high accuracy level. For example, the location estimation utilizes GPS report(s) from the user equipment device(s), when the GPS is available. Additionally or alternatively, the location estimation utilizes timing advance reports from the user equipment device(s) during handover, when the timing advance reports are available.

The disclosed aspects are also adaptive. For example, measurements from the user equipment device(s) can be used to build a reference basis (e.g., for historical measurement purposes). When there are conditions occurring that change a nearby reference (e.g., an engineering change), the disclosed location estimates can still perform accurately without making changes. Further, the disclosed aspects are scalable since no global convergence is necessary. Additionally, fast response for the location estimate can be achieved since there is no global convergence necessary.

System 100 includes at least one memory 102 (e.g., a memory device) that can store computer executable components and instructions. System 100 can also include at least one processor 104 (e.g., a processor device), communicatively coupled to the at least one memory 102. Coupling can include various communications including, but not limited to, direct communications, indirect communications, wired communications, and/or wireless communications. The at least one processor 104 can execute or facilitate execution of the computer executable components stored in the at least one memory 102. The at least one processor 104 can be directly involved in the execution of the computer executable component(s), according to an aspect. Additionally or alternatively, the at least one processor 104 can be indirectly involved in the execution of the computer executable component(s). For example, the at least one processor 104 can direct one or more components to perform the operations.

It is noted that although one or more computer executable components may be described herein and illustrated as components separate from the at least one memory 102 (e.g., operatively connected to memory), in accordance with various embodiments, the one or more computer executable components could be stored in the at least one memory 102. Further, while various components have been illustrated as separate components, it will be appreciated that multiple components can be implemented as a single component, or a single component can be implemented as multiple components, without departing from example embodiments.

System 100 also includes a receiver component 106 that can be configured to receive passive information from a user equipment device (e.g., mobile device). For example, while an active session is executing on the user equipment device, the active session might transmit various information and/or measurements that can be utilized by system 100 for location estimation of the user equipment device. The information and/or measurements can be various types of information and/or measurements that are necessary for call handling, mobility handling, radio resource handling, and various other "normal" or standard communication operations. Since this information and/or measurements are reported to the network to support other functionalities, this information and/or measurements can be leveraged for the location estimation, without any impact to the user equipment device. Further, the user equipment devices do not need to be aware that the information and/or measurements are used for location estimation purposes.

In accordance with one or more implementations, users can opt-out of providing personal information, demographic information, location information, proprietary information, sensitive information, or the like in connection with data gathering aspects. Moreover, one or more implementations described herein can provide for anonymizing collected, received, or transmitted data.

The information and/or measurements received from the user equipment device can be associated with respect time stamps. For example, when a GPS measurement is received, the corresponding time (e.g., date, time of day, day of week, and so on) can also be received. The time stamp information can be embedded, or in another manner associated, with the GPS measurement. In another example, a timing advance measurement can be received from the user equipment device and, associated with (e.g., include embedded data) related to time stamp information.

A location estimation manager component 108 can be configured to estimate the location of the user equipment devices based, at least in part, on the received information and/or estimates. According to an implementation, based on a first measurement being included in the set of measurements, the location of the user equipment device is estimated based on a timing advance measurement 110. According to another implementation, based on a first measurement being included in the set of measurements, a measurement set for the location of the user equipment device can be generated. Further details related to these location estimates will be provided below.

In order to improve user experience and network performance, wireless network operators passively calculate the location of each user equipment device (or as many user equipment devices as possible) in the network, at all places (or as many places as possible). For example, in 3GPP standardization, active, on-demand query of certain user equipment device's location is supported and defined, whenever a particular user equipment device is in the wireless network (e.g., LTE, UMTS, CDMA2000, GSM, and so on). The workflow for these on-demand query approaches includes inputting an identification of the user equipment device into the network. This triggers a series of operation and message exchanges among network elements until the location result for the user equipment device is reported back to the requesting entity. However, this approach does not scale to all the user equipment devices at the same (or substantially the same) time.

For a network operator to perform meaningful radio network coverage and capacity optimization, a drive test can be conducted to measure the signal strength and interference at different locations around the network. This can be used for networks that are in the planning stages and that will be commercially launched and/or for optimization of an existing cell site. This can be used to ensure the service quality (e.g., accessibility and retainability of key performance indicators (KPIs)). However, there are a few challenges of using a drive test since coverage of the drive test is very limited and the results of the drive test can shift over time.

In accordance with an implementation, using user equipment device measurements can be efficient with respect to both cost and result accuracy. Further, with user equipment device service quality measurements correlated with location, the network performance observed (from the perspective of the user equipment device) can be pinpointed to the location, which can be used to determine the target area of network optimization.

For known reported historical service issues, the location where the service issue was observed is important in order to correct the service issue. Therefore, the location information should be as accurate as possible. However, the quality (e.g., the location estimate accuracy) of some passive location estimate approaches might be too poor to meet the needs of the above mentioned cases. For example, the location estimate accuracy for these cases might be that the location should be within a grid with 25 meters, for example, which might not have the desired accuracy.

A passive estimation approach includes using an enhanced cell identification (e-cid) only. This approach uses the timing advance measurement from the user equipment device. The timing advance measurement is derived from a calculation that determines the time it takes for the user equipment device's radio signal to reach the serving cell. The timing advance measurements can be used to represent the distance of the user equipment device to the cell antenna. However, the timing advance measurement can be derived from a reflected signal, wherein a building or other structure is blocking the line-of-sight of the signal, although the error might be considered negligible. When the user equipment device is in a radio resource control (RRC) connected mode, timing advance measurements can be available from the base station (e.g., eNodeB, eNB, and so on). The timing advance measurement might be sampled periodically, such as every second. Using this approach, however, can only constrain the user equipment's location in an arc for a multiple sector cell tower or a ring for an omnidirectional cell tower.

Figure 2:
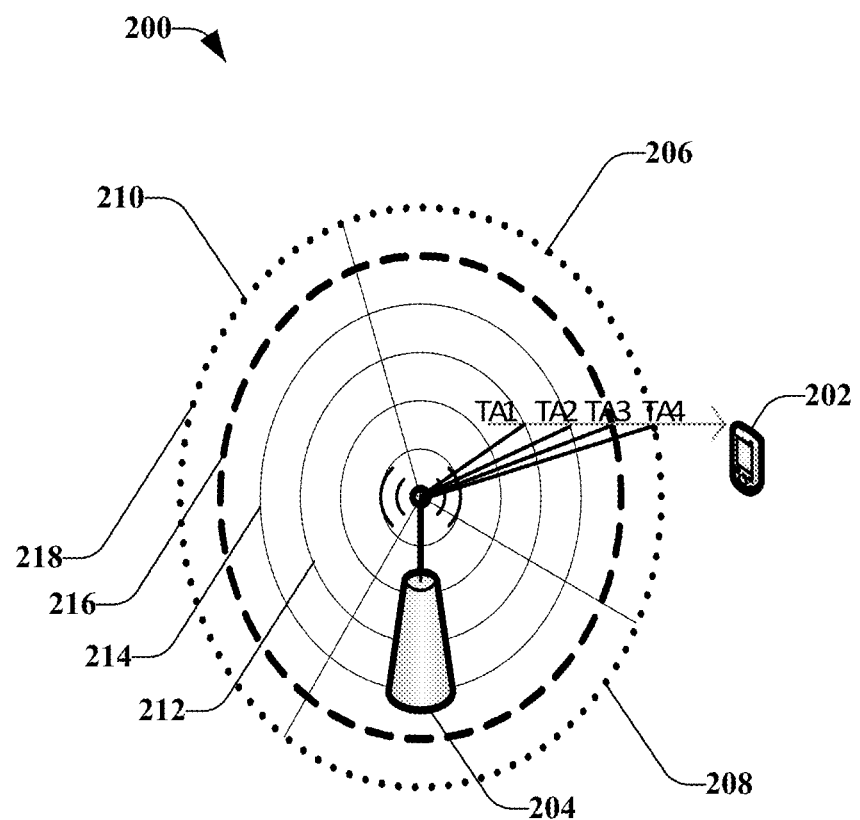
FIG. 2 illustrates an example, non-limiting plot of various timing advance measurements measured between a user equipment device and a base station.

For example, FIG. 2 illustrates an example, non-limiting plot 200 of various timing advance measurements measured between a user equipment device 202 and a base station 204. The e-cid of the base station 204 uniquely identifies that base station. As illustrated, the coverage area of the base station 204 can be divided into sectors, such as a first sector 206, a second sector 208, and a third sector 210, which are demarcated by the illustrated lines. It should be understood that although only three sectors are illustrated, the coverage area can be divided into any number of sectors.

Also illustrated are various timing advance measurements that can be captured while the user equipment device 202 is being moved, which is away from the base station 204 in this example. The accuracy of a first timing advance measurement TA1 is constrained to a first arc 212 (band or portion of a circle). The accuracy of a second timing advance measurement TA2 is constrained to a second arc 214. In a similar manner, the accuracy of a third timing advance measurement TA3 is constrained to a third arc 216 and the accuracy of a fourth timing advance measurement TA4 is constrained to a fourth arc 218. The accuracy level of this approach can be in the thousands of meters, depending on the cell tower radio frequency (RF) configuration.

Figure 3:
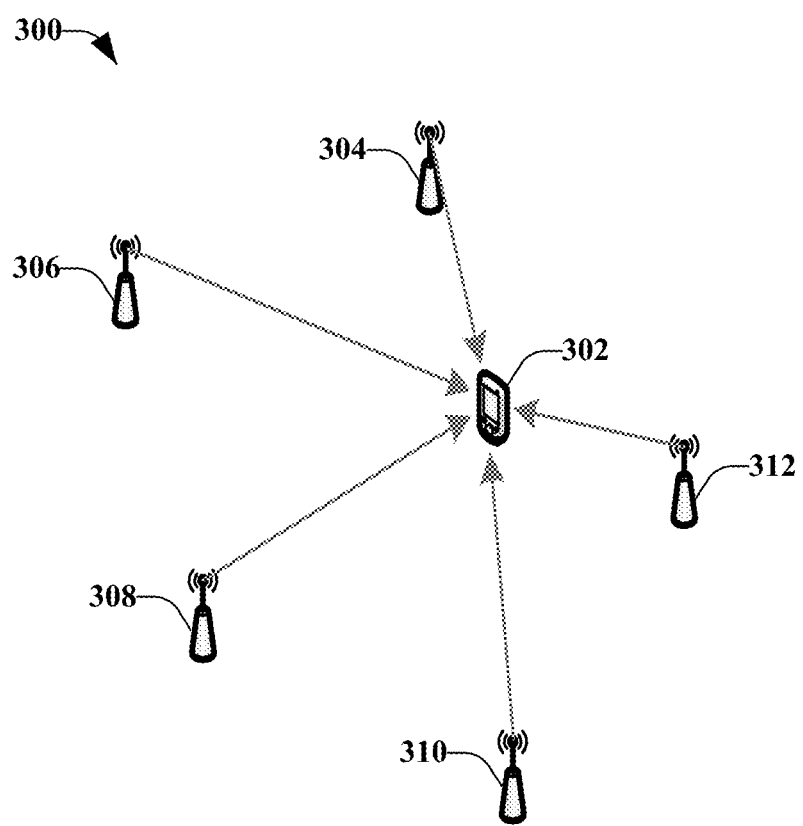
FIG. 3 illustrates an example wireless environment for using user equipment neighboring cell signal strength measurements to perform location estimation.

FIG. 3 illustrates an example wireless environment 300 for using user equipment neighboring cell signal strength measurements to perform location estimation. The use of reference signal received power (RSRP) measurements and triangulation can be utilized for location estimation. The RSRP measurement can represent the measurement of the received signal strength on the downlink. A user equipment device 302 is able to perform signal strength measurements from a serving cell (not illustrated) and neighboring cells 304, 306, 308, 310, 312 (although fewer or more than five neighboring cells can be included in a communications network) in a short time duration and can report back to the base station (e.g., serving base station). For example, the cell tower can broadcast signals on the downlink, which are received by the user equipment device. The user equipment device can evaluate the received signal strength and compare the strength with a known transmit value (e.g., the power at which the cell tower transmitted the signal). The RSRP value can provide an indication of the distance between the cell tower and the user equipment device. The RSRP value can be the value of the associated serving cell and/or one or more neighboring cells. The network can receive the respective RSRP values from the user equipment device through a control channel.

The network is aware of the locations of the neighboring cells 304, 306, 308, 310, 312 and, based on triangulation, can estimate the location of the user equipment device 302. If the serving cell signal strength has degraded below a threshold value, it can trigger a handover or transfer of control of the network communication for the user equipment device from the current serving cell to one of the neighboring cells.

This operation can be periodic or can be triggered by base station configured events (e.g., signal strength is lower than a certain threshold). With these measurement reports, triangulation and/or multilateration techniques can be applied to calculate the location of the user equipment device. The accuracy of the location estimate is only slightly better than using the location of the center point of the sector for the estimate location.

Another approach for location estimation includes using a RSRP fingerprint. This approach includes building a grid map and, further, a drive test is needed to perform the measurements at each grid point. A drive test includes dividing the space (e.g., geographic area) of interest into grids that can be similar in size and shape. A user equipment device is physically placed in each grid and is requested to perform measurements within that grid. For example, ten samples might be obtained and averaged for that particular grid. The average measurement becomes the representative measurement for that grid. This is performed independently for all the grids. Thereafter, when a user equipment device provides measurements, those measurements are compared to the grid measurements and a selection of the grid in which the user equipment device is located is derived from the comparison.

For example, the Euclidian distance between the user equipment device's measurements and the prior tests results are calculated. The grid that has the smallest Euclidian distance with the user equipment device's measurement is used as the estimate of that user equipment device's location. This approach is not practical due to the extensive drive test that is necessary. Further, a single change in the network configuration changes the fingerprint, which means the drive test needs to be performed again in the neighboring locations.

A further approach includes using both e-cid and RSRP measurements. However, this combined hybrid approach does not produce promising results and the accuracy is only in the hundreds of meters. Another approach relates to combining user equipment trace constrains. Since the user equipment device is not able to move at infinite speed, this additional condition can be used to improve the location estimation accuracy. However, even with this approach, the accuracy is still not as good as it should be.

Figure 4:
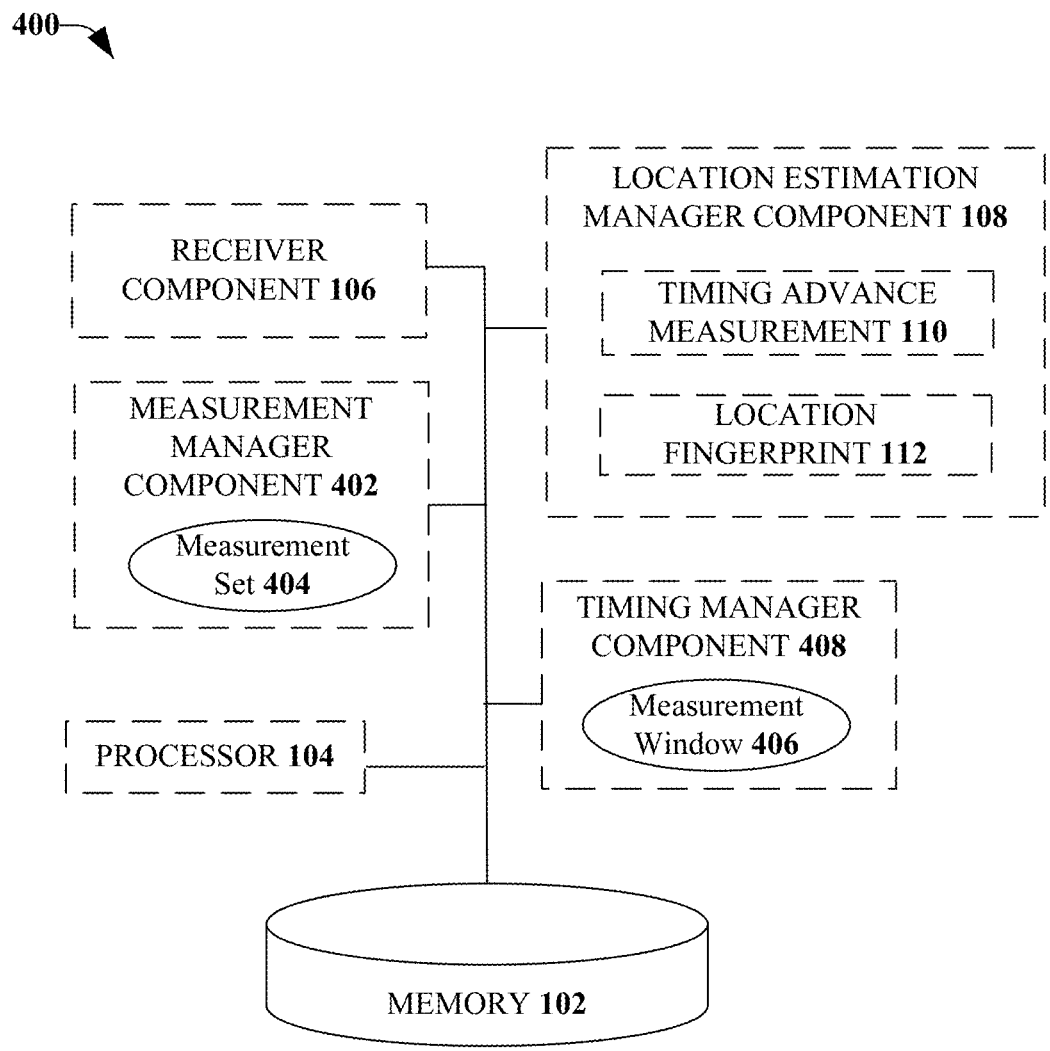
FIG. 4 illustrates an example, non-limiting system configured for dynamic network configuration based on passive location analytics, according to an aspect.

The one or more aspects disclosed herein utilize a tied approach based on the availably of the measurements. FIG. 4 illustrates an example, non-limiting system 400 configured for dynamic network configuration based on passive location analytics, according to an aspect. System 400 includes the at least one memory 102 and the at least one processor 104. Also included are the receiver component 106 and the location estimation manager component 108, which can be configured to estimate the location based on a timing advance measurement 110 and/or can generate a location measurement set 112.

Further to this implementation, a measurement manager component 402 can be configured to define a measurement set 404. The measurement set 404 can be a set of measurements received passively from the user equipment device (e.g., by the receiver component 106). Included in the measurement set 404 can be a set of measurements from GPS, including latitude, longitude, altitude, and/or speed. Additionally or alternatively, the measurement set 404 can include timing advance measurements with respect to a serving cell and one or more neighboring cells and/or RSRP/RSRQ measurements with respect to a serving cell and one or more neighboring cells.

Each measurement set 404 can be associated with the measurement user equipment device and a measurement window 406, which can be determined by a timing manager component 408. The measurement window 406 can be defined as the amount of time it takes for the user equipment device to move from a first location Tx to a second location Ts. For purposes of discussion, it can be assumed that the measuring user equipment device moves a negligible distance from its location at Tx to its location at Tx+Ts. This distance can range smaller than an averaged error of this approach. However, Ts should not be chosen to be too small. Instead, Ts should be chosen such that the measurement window includes as many measurements as possible.

Figure 5:
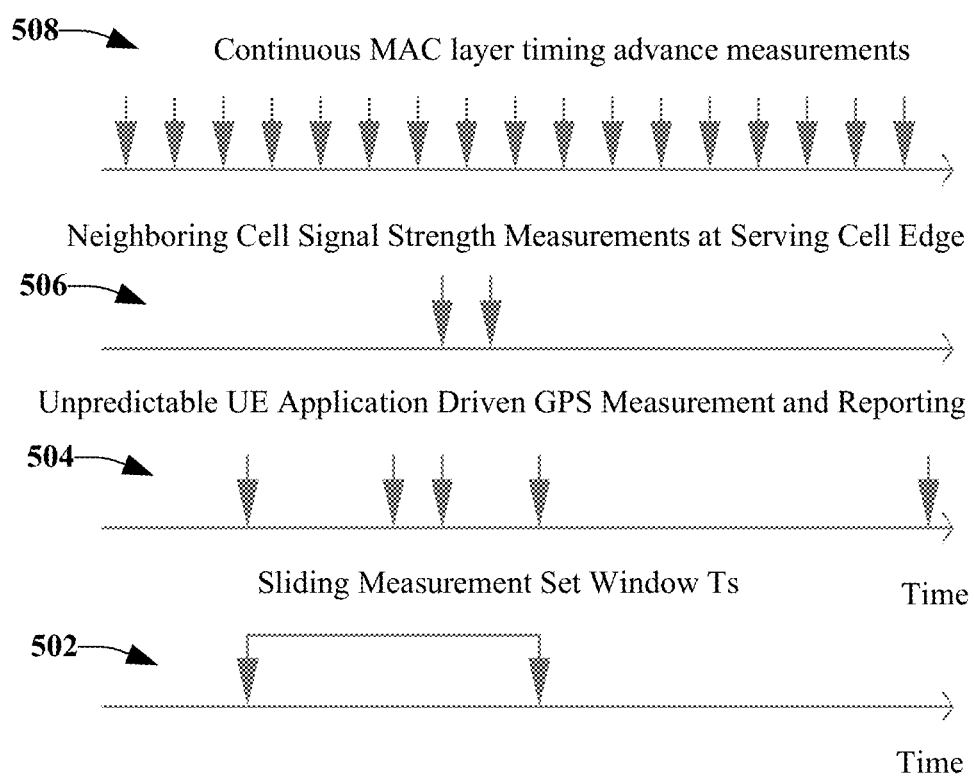
FIG. 5 illustrates various timing charts related to user equipment device cellular measurement fingerprinting with global positioning system location reference, according to an aspect.

FIG. 5 illustrates various timing charts related to user equipment device cellular measurement fingerprinting with global positioning system location reference, according to an aspect. Similar timing charts can be utilized by the timing manager component 408 to define the measurement window 406. For each chart, time is represented along the horizontal axis and from left to right (e.g., the time on the left occurs before the time on the right). The chart at the bottom of FIG. 5 represents the sliding measurement set window Ts 502, wherein the measurement is taken during the portion of time between the arrow set (e.g., as determined by the timing manager component 408).

The second chart 504 (from the bottom of FIG. 5) illustrates the unpredictable user equipment (UE) application driven GPS measurement and reporting. As illustrated, all of these measurements and reports, or at least a subset of these measurements and reports, are included within the time frame of the sliding measurement set window Ts 502. According to some implementations, there might not be any of these measurements that fall within the time frame of the sliding measurement set window Ts 502.

The third chart 506 illustrates the neighboring cell signal strength measurements at a serving cell edge. In this example, two measurements are taken and both these measurements fall within the time frame of the sliding measurement set window Ts 502. However, this is not necessarily the case and, according to some implementations, one or more of the neighboring cell signal strength measurements might fall outside the time frame of the sliding measurement set window Ts 502. According to some implementations, there might not be any of these measurements that fall within the time frame of the sliding measurement set window Ts 502.

The fourth chart 508 illustrates the continuous MAC layer timing advance measurements. As illustrated, these measurements are fairly periodic and one or more of these measurements fall within the time frame of the sliding measurement set window Ts 502. According to some implementations, however, there might not be any number of these measurements that fall within the time frame of the sliding measurement set window Ts 502.

A complete reference measurement set can be defined as the measurement set that comprises timing advance measurements, RSRP/RSRQ measurements, and GPS measurements. A partial reference measurement set can be defined as the measurement set that contains at least GPS measurements, but not all measurements (e.g., might include either the timing advance measurements or the RSRP/RSRQ measurements). A non-reference measurement set can be defined as the measurement set that does not contain a GPS measurement.

Figure 6:
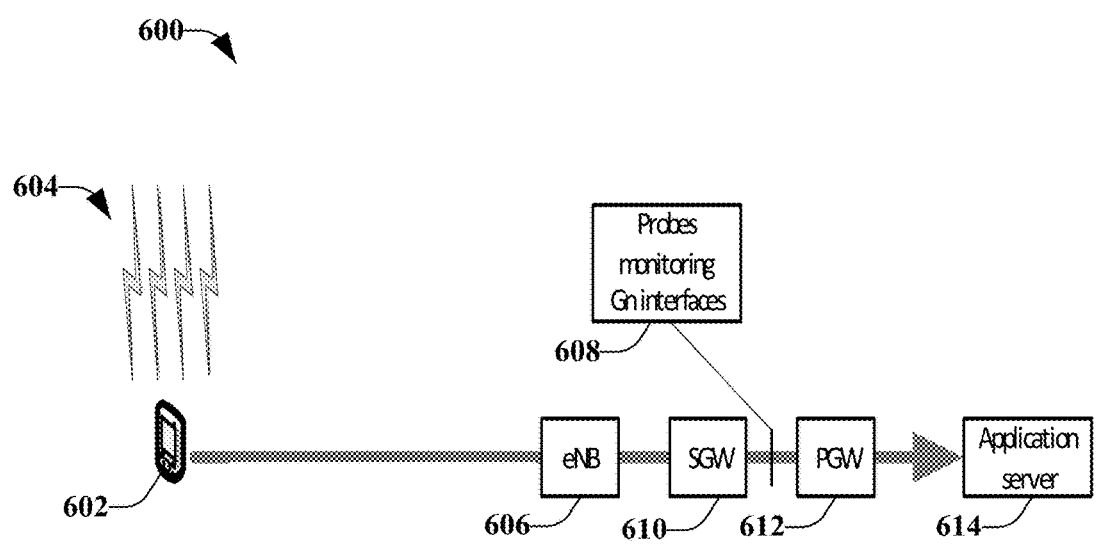
FIG. 6 illustrates an example, non-limiting representation of user equipment global positioning system measurements, according to an aspect.

As discussed the receiver component 106 obtains GPS reports (if available), as well as other information and/or other measurements (based on the availability of such information and/or measurements). FIG. 6 illustrates an example, non-limiting representation of user equipment global positioning system measurements, according to an aspect. Illustrated is a user equipment device 602. A user equipment device may contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system.

The user equipment device 602 reports its GPS measurements 604 as responses to many application calls. These applications include navigation applications, social networking applications, weather applications, and other applications that might track the location of the user equipment device 602. The GPS measurements can include latitude, longitude, altitude, speed, and so on.

The user equipment device reports back the location queries from these applications in the user plane data. The GPS measurements can be reported to application servers in an application layer protocol payload. For example, the information can be reported to a base station (e.g., eNB 606). For those probes monitoring Gn interfaces 608 between a server gateway (e.g., SGW 610) and a p packet gateway (PGW 612), this information can be acquired.

Different applications can location the GPS reports or the GPS measurements in different places in the user plane data (e.g., HTTP headers). Algorithms choosing the right signature to acquire GPS locations and filtering out non-trusted or unreliable GPS locations requires extensive analysis of these applications and their data structure. For example, a navigation application can use a number of dedicated application servers. The application running (or executing) on the user equipment device reports back its GPS location information in the HTTP header. Then the probe would collected HTTP packets towards those known application servers and cut (e.g., discard) the first several hundreds of bytes so that the GPS location information can be retained. The probe should also record the HTTP packet receive time stamp and the user equipment device international mobile subscriber identity (IMSI) from the general packet radio service (GPRS) tunneling protocol (GTP) packet header. These records can have the following example generic format:

| Timestamp | IMSI | Latitude | Longitude | Altitude | Speed |
|---|---|---|---|---|---|

Complete reference measurement sets and partial reference measurement sets can be utilized to build fingerprints of geographical cellular measurements.

When calculating a user equipment device timestamp/location pair that does not fall into any reference measurement set when the user equipment device is radio resource control (RRC) connected, the location estimation manager component 108 can utilize a shortest weighted Euclidean distance estimate to estimate the user equipment device location, for example. The weights can be on timing advance measurement and RSRP/RSRQ measurement. The GPS location of a reference measurement set that has the shortest weighted Euclidean distance to the non-reference measurement set can be used as the estimate of the user equipment device location.

Figure 7:
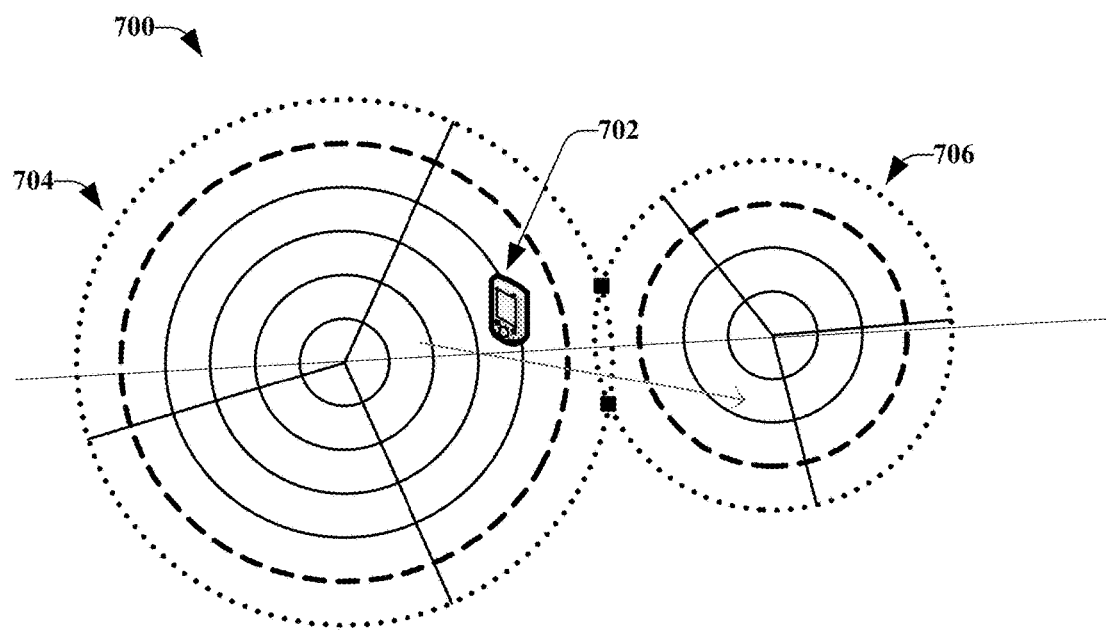
FIG. 7 illustrates an example, non-limiting representation of a user equipment device timing advance cross-handover measurement, according to an aspect.

When there is no reference measurement set or reference fingerprint that can be used and the user equipment device is performing a handover, a timing advance and handover based approach can be utilized by the location estimation manager component 108 to estimate the user equipment device location. FIG. 7 illustrates an example, non-limiting representation of a user equipment device timing advance cross-handover measurement, according to an aspect.

When a user equipment device 702 is moving from left to right and performing a handover, a left cell 704 reports a timing advance measurement of the user equipment device 702 before the handover. Further, a right cell 706 reports another timing advance measurement of the user equipment device 702 after the handover.

In this case, "Dl" can be defined as the distance of the user equipment device 702 to the left cell 704 calculated from the last timing advance cell measures for this user equipment device. "Dr" can be defined as the distance of the user equipment device 702 to the right cell 706 calculated from the first timing advance right cell 706 measurements for this user equipment device 702. "D" can be defined as the distance between the left cell 704 and the right cell 706.

If the sum of "Dl" and "Dr" is approximately equal to "D", which can be expressed as:

$$Dl+Dr \approx D$$

then the location estimate of the user equipment device 702 (as determined by the location estimation manager component 108) is on the line connecting the left cell 704 antenna and the right cell 706 antenna with "Dl" away from the left cell 704 antenna.

If the sum of "Dl" and "Dr" is less than "D", which can be expressed as:

$$Dl+Dr<D$$

then the location estimation of the user equipment device 702 is determined by the location estimation manager component 108 as being on the line connecting (e.g., a connection point") the left cell 704 antenna and the right cell 706 antenna with D*Dl/(Dl+Dr) away from the left cell antenna.

If the sum of "Dl" and "Dr" is greater than "D", which can be expressed as:

$$(Dl+Dr>D)$$

then there exist at least two possible intersections of the circle centered on the left cell antenna with radius "Dl" and the circle centered on the right cell antenna with radius "Dr". These two possible intersection locations are both candidates of the user equipment device location estimate and are illustrated as the filled in squares of FIG. 7.

The RSRP/RSRQ measurements can be used by the location estimation manager component 108 to determine which intersection of the at least two possible intersections locations is the better choice. If the cells on the same side as the intersection have stronger RSRP measurements than the other side, then the intersection is chosen to be the location estimate of the user equipment device. The timing advance measurements before and after the handover can be used to calculate the estimated azimuth, if desired.

Figure 8:
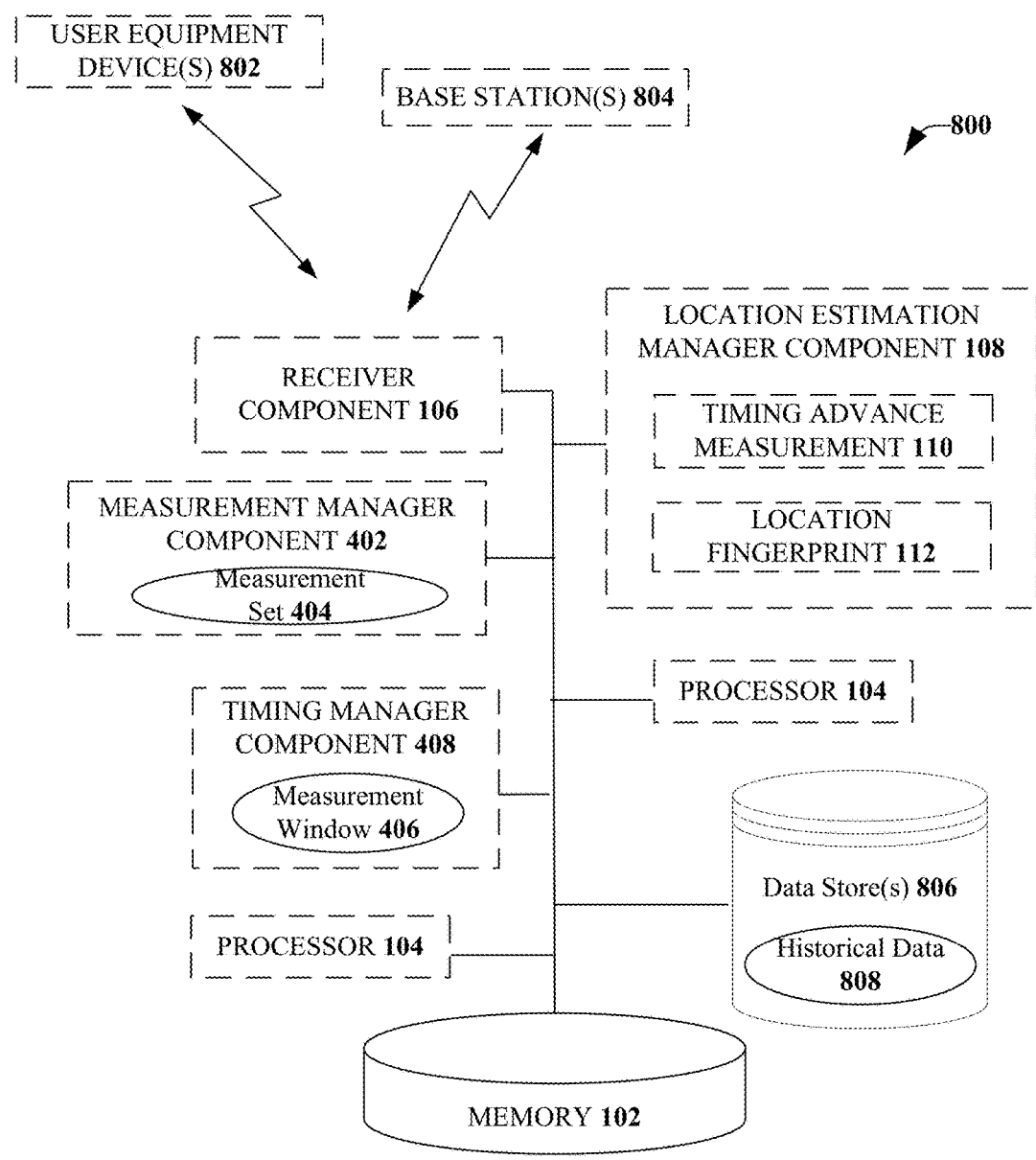
FIG. 8 illustrates an example, non-limiting system configured for location estimation and historical data collection, according to an aspect.

FIG. 8 illustrates an example, non-limiting system configured for location estimation and historical data collection, according to an aspect. System 800 includes the at least one memory 102 and the at least one processor 104. The receiver component 106 can be configured to collect various passive information and/or measurements from one or more user equipment devices 802 located within a communications network. For example, measurements from all, or a subset of, user equipment devices within the network can be collected.

The measurements collected from the one or more user equipment devices can include measurements that are communicated to the network for other purposes. For example, the measurements can be used for mobility handling, call handling, radio resource handling, and/or other operations. Thus, the measurements can be leveraged for location estimation purposes as discussed herein.

The receiver component 106 can also be configured to receive various measurements and/or other information from one or more base stations 804 within the communications network. According to an aspect, the one or more base stations 804 can monitor their surrounding radio conditions (e.g., by employing respective measurement components). For example, each of the base stations can determine network traffic load on its respective network by performing a network diagnostic procedure. As an example, during a network listen procedure, each base station can scan its respective radio environment to determine network performance statistics. Various parameters associated with each base station can be detected during the network diagnostic procedure, such as, but not limited to, frequency bands, scrambling codes, common channel pilot power, bandwidth across respective networks, universal mobile telecommunications system terrestrial radio access receive signal strength indicator, and so on.

One or more user devices and/or the network (e.g., one or more base stations) might experience interference in a location due to overlapping coverage and/or due to other parameters (e.g., uplink interference, downlink interference, and so on). The interference can cause the possibility that a connection might be lost (e.g., dropped call) or that other negative impacts to the user experience could occur (e.g., disruption during the communication, slow response of data, and so on). Therefore, in accordance with the disclosed aspects, the interference experienced by each user equipment device, as well as other metrics related to the user equipment devices and/or each network, are monitored and various adjustments are made to one or more settings in order to mitigate the interference experienced by each mobile device and/or each network (e.g., each cell, each base station).

User equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network can be packet-based; however, radio and frequency/amplitude modulation networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice traffic, data traffic, and so on) between one or more components can include, wired communications (e.g., routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like). In accordance with some embodiments, one or more of the user equipment devices can be capable of simultaneous connection to the networks. For example, a user equipment device can be a multi-mode device.

A network can include a plurality of elements that host logic for performing tasks on the network. The logic can be hosted on servers, according to an aspect. In packet-based wide-area networks, servers may be placed at several logical points on the network. Servers may further be in communication with databases and can enable communication devices to access the contents of a database. Billing servers and application servers are examples of such servers. A server can include several network elements, including other servers, and can be logically situated anywhere on a service provider's network, such as the back-end of a cellular network. A server hosts or is in communication with a database hosting an account for a user of a mobile device. A "user account" includes several attributes for a particular user, including a unique identifier of the mobile device(s) owned by the user, relationships with other users, application usage, location, personal settings, business rules, bank accounts, and other information.

The measurements and/or other information received by the receiver component 106 can be retained in one or more data stores 806. As illustrated the one or more data stores 806 can be located separate from the at least one memory. However, according to some aspects, at least a portion of one or more data stores can be located internal to memory. According to some implementations, one or more data stores can be located external to system 800 (e.g., maintained by a third party) and accessible by system 800.

The location estimation manager component 108 can be configured to performed location for all the user equipment devices from which measurements were collected, or for at least a subset of the user equipment devices. The location estimates can be retained in the one or more data stores 806 as historical data sets 808 and can be utilized later for historical localization purposes. For example, if the location of a particular user equipment device for a particular time and day (e.g., yesterday at 2:00 p.m.) is desired, for active localization, the location cannot be determined. This is because active localization requires interaction from the user equipment device and it is not possible to acquire (e.g., trigger) this information for a past event. However, for passive location estimation, as discussed herein, the information is being collected by the network in a passive and on-going manner and, therefore, can be determined for a past event.

The historical data sets 808 can be maintained in different formats and can be categorized based on one or more parameters of the respective user equipment device. For example, the location information can be categorized based on a vendor that manufactured the user equipment device, based on a phone model, or based on other parameters of the mobile device. According to some aspects, the location information can be categorized based on time of day, day of week, and other information related to the time stamp associated with the received measurements.

According to some implementations, the various aspects disclosed herein can utilize an artificial intelligence component (not shown), which can facilitate automating one or more features in accordance with the disclosed aspects. As discussed herein, the disclosed aspects can be utilized to perform location estimation for improvements to radio network coverage and capacity optimization. The disclosed aspects in connection with location estimation can employ various artificial intelligence-based schemes for carrying out various aspects thereof. For example, a process for receiving passive information from one or more user equipment devices, receiving measurements and other data from various network devices, estimating a location of each user equipment device (or a subset of the user equipment devices), and so forth can be facilitated with an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine is an example of a classifier that can be employed. The support vector machine can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing usage of the user equipment device, by observing a movement pattern of the user equipment device, and so on). For example, support vector machines can be configured via a learning or training phase within a classifier constructor and feature selection module. Thus, the classifier(s) can be used to automatically learn and perform a number of functions, including but not limited to obtaining various measurements from user equipment devices and/or network devices, defining an interval for measurement collection, analyzing the collected information, creating one or more measurement sets, and estimating locations of various user equipment devices, and so on. The criteria can include, but is not limited to, a type of network, location of the mobile device, a transmit power level of the cell, an orientation of an antenna of a cell, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, in local, cloud, and/or virtualized environment, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor and/or one or more network devices comprising at least one processor. Further, the methods can be implemented in one or more devices of a network and/or one or more devices located outside the network, but in communication with the network.

Figure 9:
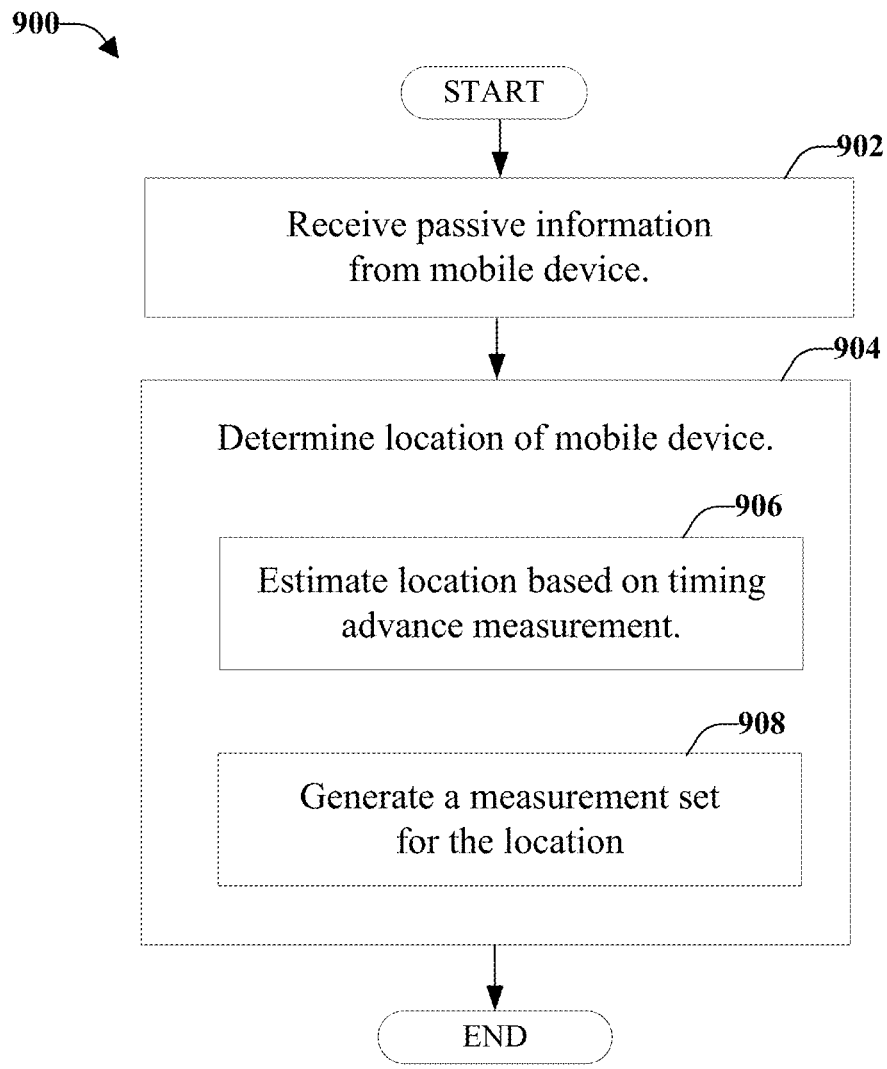
FIG. 9 illustrates an example, non-limiting method for dynamic network configuration based on passive location analytics, according to an aspect.

FIG. 9 illustrates an example, non-limiting method 900 for dynamic network configuration based on passive location analytics, according to an aspect. As usage of mobile communications networks, such as, but not limited to voice over long term evolution (LTE), increases, location estimation of devices and the associated service issues that might be experienced at various locations is in the network increases in importance. The location estimation can be performed based on a passive estimate location approach.

At 902, passive information is received from a mobile device during a defined interval (e.g., using the receiver component 106). The defined interval can be a configurable interval that is selected based on the amount of time it takes for a mobile device to move from a first location to a second location. The interval should be selected such that measurements related to one or more of GPS measurements, RSRP measurements, and/or timing advance measurements can be received from the mobile device. However, the interval should not be such a large interval of time that the evaluation of such measurements becomes cumbersome. According to some implementations, the interval should be chosen such that at least a GPS measurement is received from the mobile device. The passive information can also be received while an active session is executing on the mobile device. Further, the passive information comprises a set of measurements that are associated with respective time stamps.

According to an implementation, receiving the passive information includes receiving from the mobile device report data representing a measurement report that is used to maintain network communication with the mobile device. According to some implementations, receiving the passive information includes receiving report data comprising a global positioning system report from the active session running on the mobile device.

At 904, a location of the mobile device is determined based on the received passive information (e.g., using the location estimation manager component 108). Determining the location can include, based on a first measurement of the set of measurements, estimating the location of the mobile device based on a timing advance measurement, at 906. According to another implementation, determining the location can include, based on a second measurement of the set of measurements, generating a measurement set for the location of the mobile device, at 908.

According to some implementations, the method 900 can also include storing the location of the mobile device as a historical data set. The historical data set can be utilized for dynamic network configuration and for other purposes related to improving a user experience and optimizing system performance.

Figure 10:
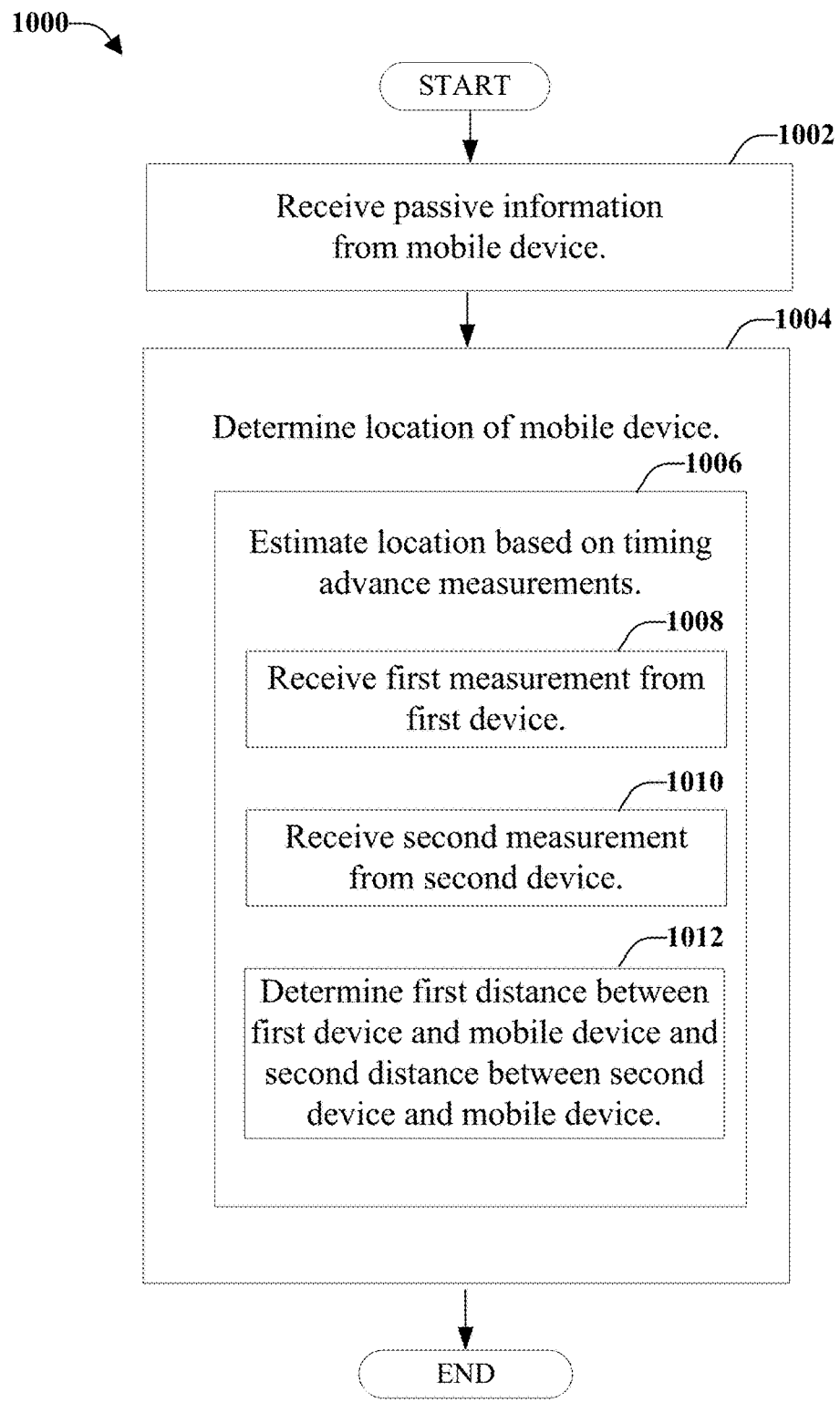
FIG. 10 illustrates an example, non-limiting method for location estimation, according to an aspect.

FIG. 10 illustrates an example, non-limiting method 1000 for location estimation, according to an aspect. At 1002, passive information is received from a mobile device (e.g., using the receiver component 106) and, at 1004, the location of the mobile device is determined (e.g., using the location estimation manager component 108). Determining the location of the mobile device can include estimating the location based on timing advance measurements, at 1006.

Estimating the location based on the timing advanced measurements can include receiving, at 1008, a first measurement from a first device of a first network, such as a source base station (e.g., using the receiver component 106). At 1010, a second measurement is received (e.g., using the receiver component 106) from a second device of a second network, such as target base station. For example, a network communication of the mobile device can be transferred from the first device of the first network (e.g., source base station or source network) and to the second device of the second network (e.g., target base station or target network). For example, the first measurement can be received prior to the network traffic being transferred and the second measurement can be received after the network traffic has been transferred.

At 1012, a first distance and a second distance are determined (e.g., using the measurement manager component 402). The first distance can be defined between the first device and the mobile device and is based on the first measurement. The second distance is defined between the second device and the mobile device and is based on the second measurement. Determining the location can also include determining the location of the mobile device based on the first distance, the second distance, and a known distance (e.g., a determined distance or an established distance) between the first device and the second device. For example, base stations are generally fixed in a certain geographic location and, therefore, the distance between the base stations can be known in advanced. For an ad hoc network, the location between the networks can be based on GPS or other location measurements and the distance between networks can be determined based on the GPS or other location measurements.

According to an implementation, determining the location includes determining that a first value that represents a sum of the first distance and the second distance is substantially equal to a second value that represents the known distance. Further, a determination is made that the location of the mobile device is on a line connecting the first device and the second device According to another implementation, determining the location includes determining that a first value that represents a sum of the first distance and the second distance is less than a second value that represents the known distance. Further, a determination is made that the location of the mobile device is on a line connecting the first device and the second device at a third distance away from the first device.

In accordance with a further implementation, determining the location includes determining that a first value that represents a sum of the first distance and the second distance is greater than a second value that represents the known distance. Further, a first intersection location is identified based on a first radius of the first distance and a second intersection location based on a second radius of the second distance. A first set of signal strength measurements for the first device and a second set of signal strength measurements for the second device are evaluated and a first subset of the first set of signal strength measurements and a second subset of the second set of signal strength measurements are selected. In addition, based on the selection of the first subset and the second subset, the location of the mobile device is selected from a group of locations comprising the first intersection location and the second intersection location.

Figure 11:
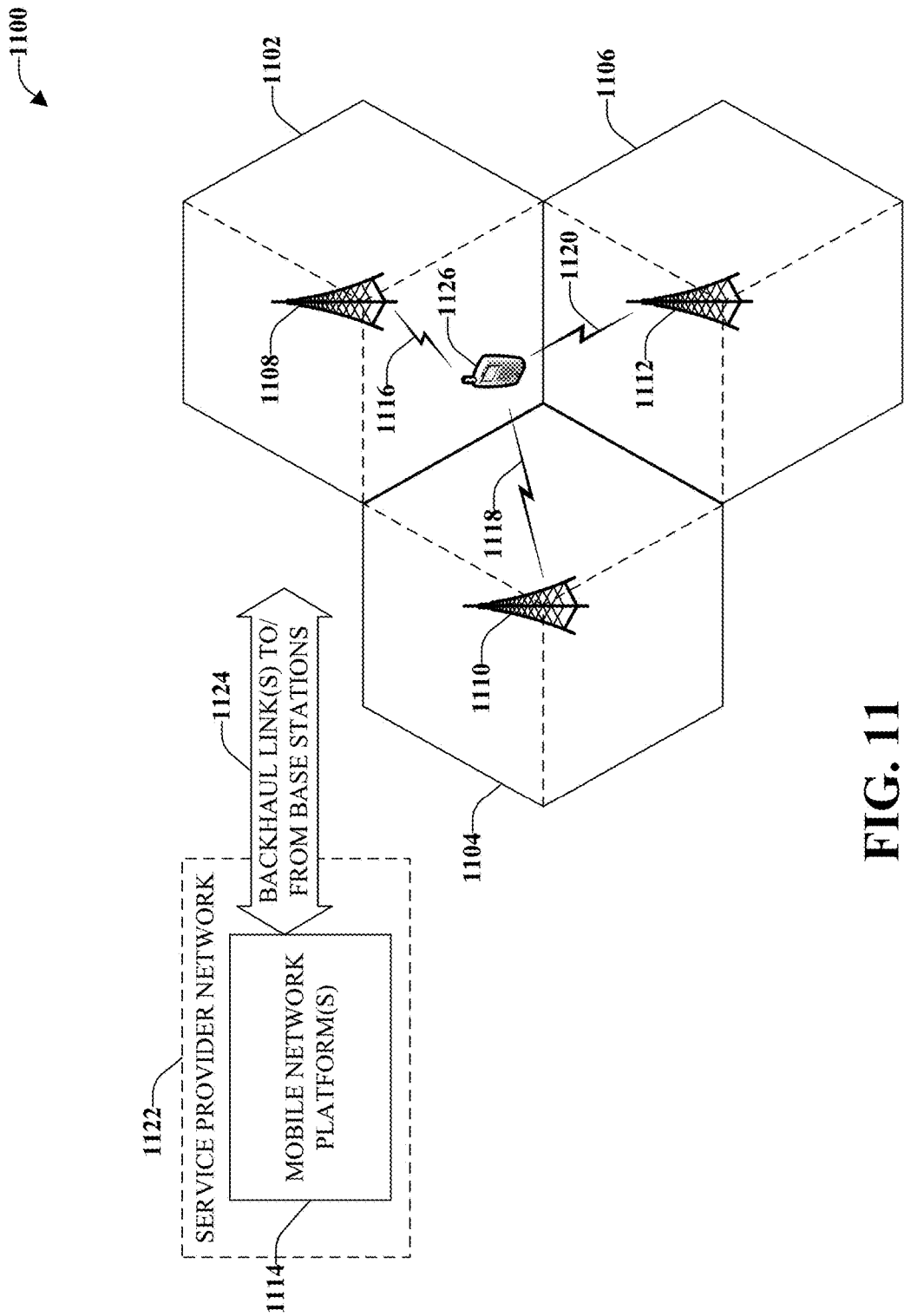
FIG. 11 is a schematic example wireless environment that can operate in accordance with aspects described herein.

By way of further description with respect to one or more non-limiting ways to improve coverage capacity and performance through passive location estimation, FIG. 11 is a schematic example wireless environment 1100 that can operate in accordance with aspects described herein. In particular, example wireless environment 1100 illustrates a set of wireless network macro cells. Three coverage macro cells 1102, 1104, and 1106 include the illustrative wireless environment; however, it is noted that wireless cellular network deployments can encompass any number of macro cells. Coverage macro cells 1102, 1104, and 1106 are illustrated as hexagons; however, coverage cells can adopt other geometries generally dictated by a deployment configuration or floor plan, geographic areas to be covered, and so on. Each macro cell 1102, 1104, and 1106 is sectorized in a $2\pi/3$ radians per sector configuration in which each macro cell includes three sectors, demarcated with dashed lines in FIG. 11. It is noted that other sectorizations are possible, and aspects or features of the disclosed subject matter can be exploited regardless of type of sectorization. Macro cells 1102, 1104, and 1106 are served respectively through base stations or eNodeBs 1108, 1110, and 1112. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1114, and set of base stations (e.g., eNode B 1108, 1110, and 1112) that serve a set of macro cells; electronic circuitry or components associated with the base stations in the set of base stations; a set of respective wireless links (e.g., links 1116, 1118, and 1120) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 1116, 1118, and 1120 embody a Uu interface (universal mobile telecommunication system Air Interface).

Mobile network platform(s) 1114 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 1122 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 1114 can control and manage base stations 1108, 1110, and 1112 and radio component(s) associated thereof, in disparate macro cells 1102, 1104, and 1106 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 1114 can be embodied in the service provider network 1122.

In addition, wireless backhaul link(s) 1124 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 1124 embodies IuB interface.

It is noted that while exemplary wireless environment 1100 is illustrated for macro cells and macro base stations, aspects of the disclosed subject matter can be implemented in micro cells, pico cells, femto cells, or the like, wherein base stations are embodied in home-based equipment related to access to a network.

Figure 12:
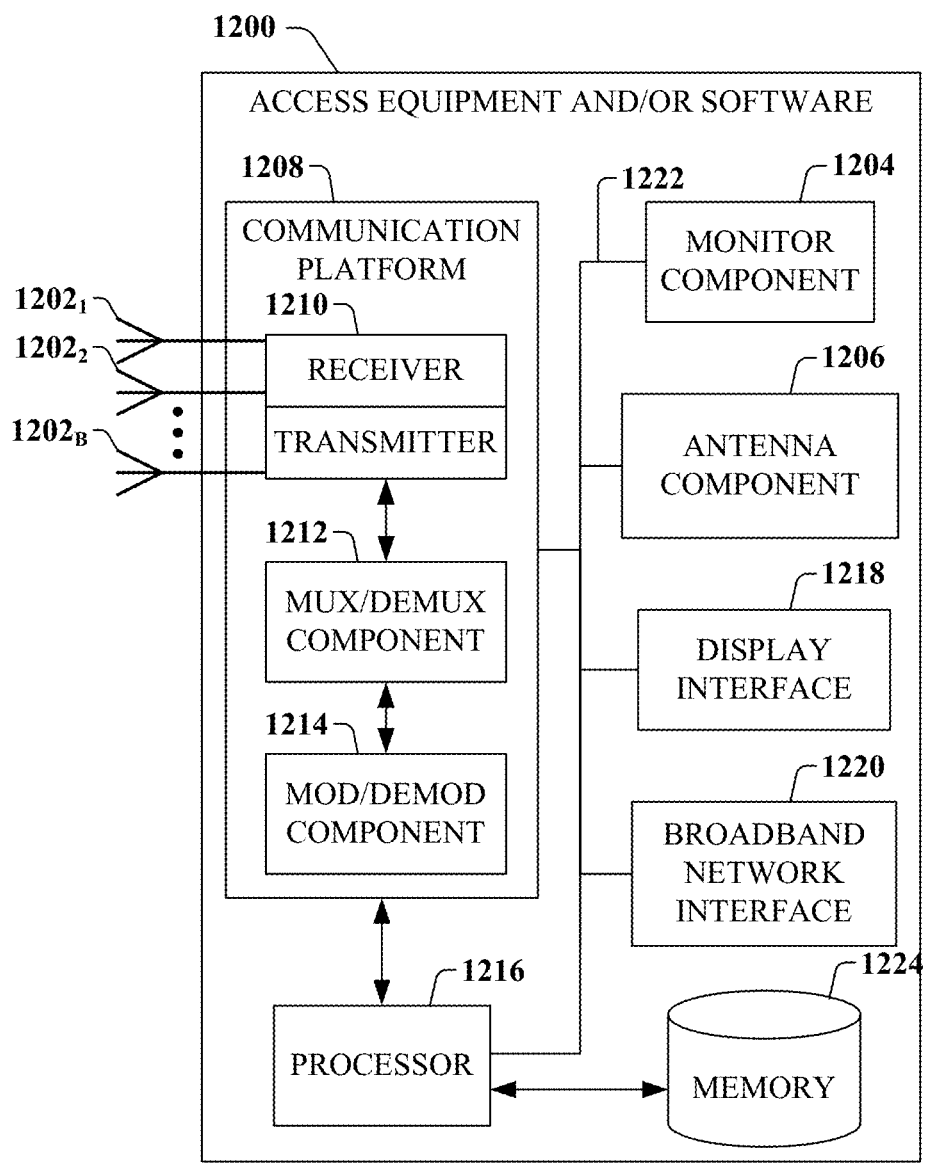
FIG. 12 illustrates a block diagram of access equipment and/or software related to access of a network, in accordance with an embodiment.

To provide further context for various aspects of the disclosed subject matter, FIG. 12 illustrates a block diagram of an embodiment of access equipment and/or software 1200 related to access of a network (e.g., base station, wireless access point, femto cell access point, and so forth) that can enable and/or exploit features or aspects of the disclosed aspects.

Access equipment and/or software 1200 related to access of a network can receive and transmit signal(s) from and to wireless devices, wireless ports, wireless routers, etc. through segments $1202_1$-$1202_B$ (B is a positive integer). Segments $1202_1$-$1202_B$ can be internal and/or external to access equipment and/or software 1200 related to access of a network, and can be controlled by a monitor component 1204 and an antenna component 1206. Monitor component 1204 and antenna component 1206 can couple to communication platform 1208, which can include electronic components and associated circuitry that provide for processing and manipulation of received signal(s) and other signal(s) to be transmitted.

In an aspect, communication platform 1208 includes a receiver/transmitter 1210 that can convert analog signals to digital signals upon reception of the analog signals, and can convert digital signals to analog signals upon transmission. In addition, receiver/transmitter 1210 can divide a single data stream into multiple, parallel data streams, or perform the reciprocal operation. Coupled to receiver/transmitter 1210 can be a multiplexer/demultiplexer 1212 that can facilitate manipulation of signals in time and frequency space. Multiplexer/demultiplexer 1212 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1212 can scramble and spread information (e.g., codes, according to substantially any code known in the art, such as Hadamard-Walsh codes, Baker codes, Kasami codes, polyphase codes, and so forth).

A modulator/demodulator 1214 is also a part of communication platform 1208, and can modulate information according to multiple modulation techniques, such as frequency modulation, amplitude modulation (e.g., M-ary quadrature amplitude modulation, with M a positive integer); phase-shift keying; and so forth).

Access equipment and/or software 1200 related to access of a network also includes a processor 1216 configured to confer, at least in part, functionality to substantially any electronic component in access equipment and/or software 1200. In particular, processor 1216 can facilitate configuration of access equipment and/or software 1200 through, for example, monitor component 1204, antenna component 1206, and one or more components therein. Additionally, access equipment and/or software 1200 can include display interface 1218, which can display functions that control functionality of access equipment and/or software 1200, or reveal operation conditions thereof. In addition, display interface 1218 can include a screen to convey information to an end user. In an aspect, display interface 1218 can be a liquid crystal display, a plasma panel, a monolithic thin-film based electrochromic display, and so on. Moreover, display interface 1218 can include a component (e.g., speaker) that facilitates communication of aural indicia, which can also be employed in connection with messages that convey operational instructions to an end user. Display interface 1218 can also facilitate data entry (e.g., through a linked keypad or through touch gestures), which can cause access equipment and/or software 1200 to receive external commands (e.g., restart operation).

Broadband network interface 1220 facilitates connection of access equipment and/or software 1200 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1220 can be internal or external to access equipment and/or software 1200, and can utilize display interface 1218 for end-user interaction and status information delivery.

Processor 1216 can be functionally connected to communication platform 1208 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1216 can be functionally connected, through data, system, or an address bus 1222, to display interface 1218 and broadband network interface 1220, to confer, at least in part, functionality to each of such components.

In access equipment and/or software 1200, memory 1224 can retain location and/or coverage area (e.g., macro sector, identifier(s)) access list(s) that authorize access to wireless coverage through access equipment and/or software 1200, sector intelligence that can include ranking of coverage areas in the wireless environment of access equipment and/or software 1200, radio link quality and strength associated therewith, or the like. Memory 1224 also can store data structures, code instructions and program modules, system or device information, code sequences for scrambling, spreading and pilot transmission, access point configuration, and so on. Processor 1216 can be coupled (e.g., through a memory bus), to memory 1224 in order to store and retrieve information used to operate and/or confer functionality to the components, platform, and interface that reside within access equipment and/or software 1200.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1224, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 13:
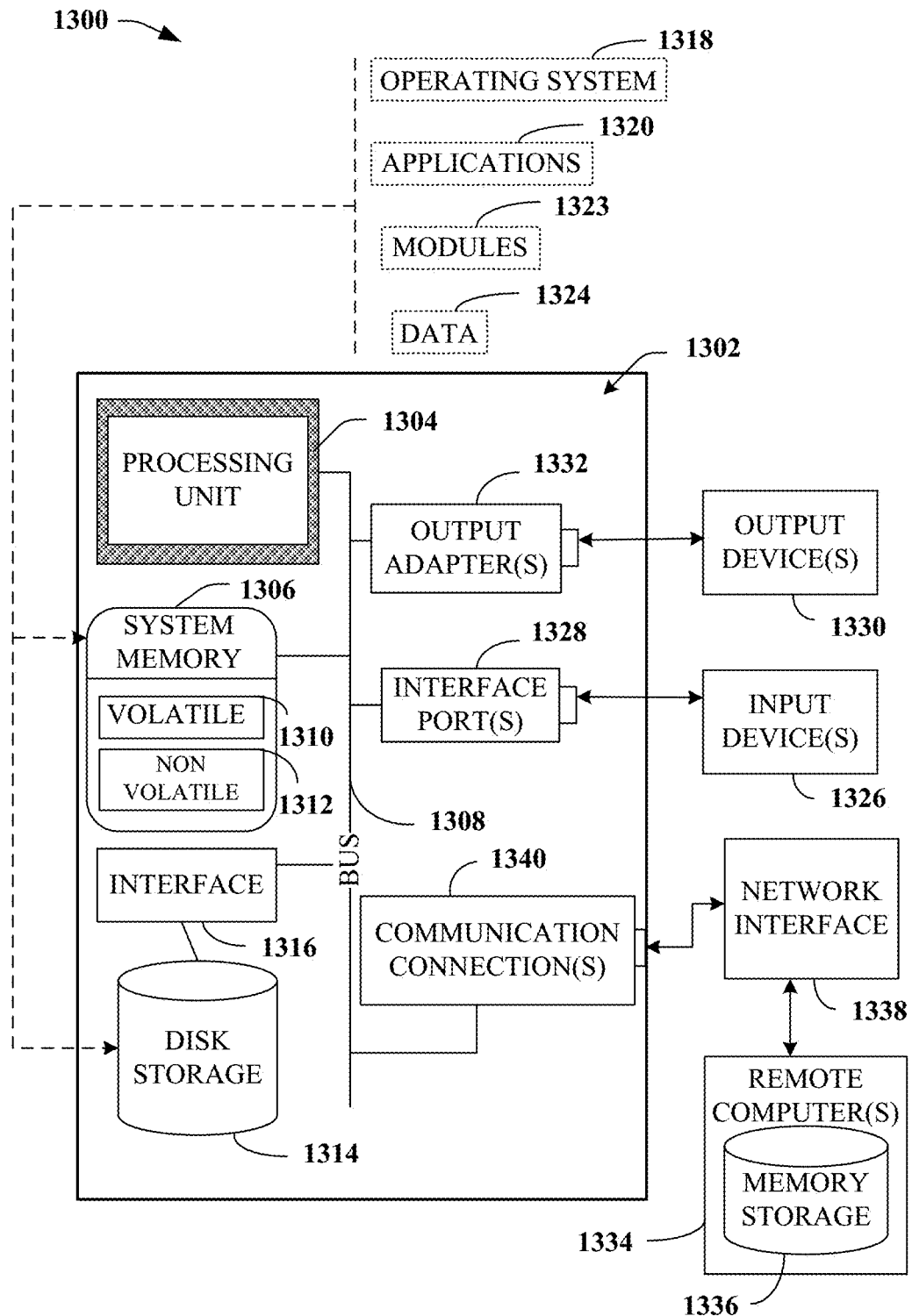
FIG. 13 illustrates a block diagram of a computing system, in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as at least one memory 102) there can be software, which can instruct a processor (such as at least one processor 104) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 13, a block diagram of a computing system 1300 operable to execute the disclosed systems and methods is illustrated, in accordance with an embodiment. Computer 1302 includes a processing unit 1304, a system memory 1306, and a system bus 1308. System bus 1308 couples system components including, but not limited to, system memory 1306 to processing unit 1304. Processing unit 1304 can be any of various available processors. Dual microprocessors and other multiprocessor architectures also can be employed as processing unit 1304.

System bus 1308 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1306 includes volatile memory 1310 and nonvolatile memory 1312. A basic input/output system, containing routines to transfer information between elements within computer 1302, such as during start-up, can be stored in nonvolatile memory 1312. By way of illustration, and not limitation, nonvolatile memory 1312 can include read only memory, programmable read only memory, electrically programmable read only memory, electrically erasable programmable read only memory, or flash memory. Volatile memory 1310 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1302 also includes removable/non-removable, volatile/non-volatile computer storage media. In an implementation, provided is a non-transitory or tangible computer-readable storage device storing executable instructions that, in response to execution, cause a system comprising a processor to perform operations. The operations can include receiving, during a defined interval, passive information from a mobile device while an active session is executing on the mobile device. The passive information comprises a set of measurements associated with respective time stamps. The defined interval comprises a measurement window defined as an amount of time for the mobile device to move from a first location to a second location. The operations can also include determining, a location of the mobile device comprising: based on a first measurement of the set of measurements, estimating the location of the mobile device based on a timing advance measurement; and based on a second measurement of the set of measurements, generating a measurement set for the location of the mobile device. Further, the operations can include storing the location of the mobile device as a historical data set.

According to an implementation, the operations include receiving a third measurement from a first device of a first network and receiving a fourth measurement from a second device of a second network. A network communication of the mobile device can be transferred from the first device to the second device. The operations can also include determining a first distance between the first device and the mobile device based on the third measurement and a second distance between the second device and the mobile device based on the fourth measurement. Determining the location can comprise determining the location of the mobile device based on the first distance, the second distance, and an established distance between the first device and the second device.

In accordance with an implementation, the operations include determining that a first value that represents a sum of the first distance and the second distance is greater than a second value that represents the established distance. Further, the operations can include identifying a first intersection location based on a first radius of the first distance and a second intersection location based on a second radius of the second distance. The operations also include evaluating a first set of signal strength measurements for the first device and a second set of signal strength measurements for the second device and selecting a first subset of the first set of signal strength measurements and a second subset of the second set of signal strength measurements. Further, based on selecting the first subset and the second subset, the operations can include selecting the location of the mobile device from a group of locations comprising the first intersection location and the second intersection location.

According to some implementations, the operations can include determining that a first value that represents a sum of the first distance and the second distance is less than a second value that represents the established distance. Further, determining the location can include determining the mobile device is on a connection point between the first device and the second device at a third distance away from the first device.

In accordance with some implementations, the operations can include determining that a first value that represents a sum of the first distance and the second distance is substantially equal to a second value that represents the established distance. Further, determining the location can include determining the mobile device is on a connection point between the first device and the second device FIG. 13 illustrates, for example, disk storage 1314. Disk storage 1314 includes, but is not limited to, devices such as a magnetic disk drive, floppy disk drive, tape drive, external or internal removable storage drives, superdisk drive, flash memory card, or memory stick. In addition, disk storage 1314 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1314 to system bus 1308, a removable or non-removable interface is typically used, such as interface component 1316.

It is to be noted that FIG. 13 describes software that acts as an intermediary between users and computer resources described in suitable operating environment. Such software includes an operating system 1318. Operating system 1318, which can be stored on disk storage 1314, acts to control and allocate resources of computer system 1302. System applications 1320 can take advantage of the management of resources by operating system 1318 through program modules 1322 and program data 1324 stored either in system memory 1306 or on disk storage 1314. It is to be understood that the disclosed subject matter can be implemented with various operating systems or combinations of operating systems.

A user can enter commands or information, for example through interface component 1316, into computer system 1302 through input device(s) 1326. Input devices 1326 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1304 through system bus 1308 through interface port(s) 1328. Interface port(s) 1328 include, for example, a serial port, a parallel port, a game port, and a universal serial bus. Output device(s) 1330 use some of the same type of ports as input device(s) 1326.

Thus, for example, a universal serial bus port can be used to provide input to computer 1302 and to output information from computer 1302 to an output device 1330. Output adapter 1332 is provided to illustrate that there are some output devices 1330, such as monitors, speakers, and printers, among other output devices 1330, which use special adapters. Output adapters 1332 include, by way of illustration and not limitation, video and sound cards that provide means of connection between output device 1330 and system bus 1308. It is also noted that other devices and/or systems of devices provide both input and output capabilities such as remote computer(s) 1334.

Computer 1302 can operate in a networked environment using logical connections to one or more remote computers, such as remote computer(s) 1334. Remote computer(s) 1334 can be a personal computer, a server, a router, a network computer, a workstation, a microprocessor based appliance, a peer device, or other common network node and the like, and typically includes many or all of the elements described relative to computer 1302.

For purposes of brevity, only one memory storage device 1336 is illustrated with remote computer(s) 1334. Remote computer(s) 1334 is logically connected to computer 1302 through a network interface 1338 and then physically connected through communication connection 1340. Network interface 1338 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1340 refer(s) to hardware/software employed to connect network interface 1338 to system bus 1308. While communication connection 1340 is shown for illustrative clarity inside computer 1302, it can also be external to computer 1302. The hardware/software for connection to network interface 1338 can include, for example, internal and external technologies such as modems, including regular telephone grade modems, cable modems and DSL modems, ISDN adapters, and Ethernet cards.

It is to be noted that aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

It is noted, for the avoidance of doubt, any embodiments described herein in the context of "optimizing" one or more parameters and/or performance are not so limited. Instead such terms should be considered also to cover any techniques that implement underlying aspects or parts of the below-described aspects to improve or increase various parameters and/or performance, even if resulting in a suboptimal variant obtained by relaxing aspects or parts of a given implementation or embodiment. Further, although various performance indicators, metrics, success metrics, and/or objective metrics might be described as "key", such term can apply to different indicators and/or metrics as determined during implementation of the disclosed aspects. For example, what might be considered "key" in a first implementation might not be considered "key" in a second implementation or in other implementations.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
   a processor; and
   a memory that stores executable instructions that, when executed by the processor, facilitate performance of operations, comprising:
      based on a time period during which a mobile device is determined to have moved from a first location to a second location, sliding a measurement window of time along a time axis;
      receiving passive information from the mobile device, wherein the passive information is information that has been generated in response to a request by an application of the mobile device and comprises first measurement data indicative of measurements associated with respective time stamps, and wherein the sliding comprises sliding the measurement window of time to comprise some of the measurements that satisfy a defined number criterion;
      based on the passive information, determining location data indicative of a location of the mobile device, wherein the location data is employable to facilitate management of a communication network that serves the mobile device, wherein the determining the location data comprises determining the location of the mobile device based on distance data indicative of a first distance between the mobile device and a first device of a first network and indicative of a second distance between the mobile device and a second device of a second network, wherein the determining the location data comprises determining the location of the mobile device further based on an established distance between the first device and the second device, and wherein a network communication of the mobile device is determined to be transferred from the first device to the second device; and
      in response to verifying that a first value representing a sum of the first distance and the second distance is less than a second value representing the established distance, determining, based on the location data, that the mobile device is located on a connection point between the first device and the second device at a third distance away from the first device.

2. The system of claim 1, wherein the first measurement data comprises data that represents a global positioning system measurement that falls within the measurement window of time.

3. The system of claim 2, wherein the data is directed from the mobile device to an application server associated with the application.

4. The system of claim 3, wherein the receiving comprises receiving the passive information via a probe device that monitors the data directed from the mobile device to the application server.

5. The system of claim 4, wherein the probe device filters communication data transferred between the mobile device and the application server to determine the data.

6. The system of claim 1, wherein the operations further comprise:
   receiving the second measurement data from the first device; and
   receiving the third measurement data from the second device.

7. The system of claim 6, wherein the distance data is determined based on the second measurement data and the third measurement data.

8. The system of claim 7, wherein the operations further comprise:
in response to verifying that a first value representing a sum of the first distance and the second distance equals a second value representing the established distance, determining, based on the location data, that the mobile device is located on a connection point between the first device and the second device.

9. The system of claim 1, wherein the operations further comprise:
based on the location data, facilitating an increase in a capacity of resources of the communication network.

10. The system of claim 1, wherein the operations further comprise:
based on the location data, facilitating an increase in a coverage of the communication network.

11. A method, comprising:
based on timing data representing a timing interval during which a mobile device is determined to have moved from a first location to a second location, moving, by a system comprising a processor, a measurement window of time along a time axis;
determining, by the system, passive information associated with a location of the mobile device, wherein the passive information is information that is transferred from the mobile device in response to a request from an application of the mobile device, wherein the passive information comprises first measurement data representing measurements associated with respective time stamps, and wherein the moving comprises moving the measurement window of time to comprise some of the measurements that satisfy a defined number criterion;
based on the passive information, determining, by the system, location data indicative of the location of the mobile device to facilitate management of a communication network that serves the mobile device, wherein the determining the location data comprises determining the location of the mobile device based on distance data indicative of a first distance between the mobile device and a first device of a first network and indicative of a second distance between the mobile device and a second device of a second network, wherein the determining the location data comprises determining the location of the mobile device further based on an established distance between the first device and the second device, and wherein a network communication of the mobile device is determined to be transferred from the first device to the second device; and
determining, by the system, that a first value representing a sum of the first distance and the second distance is less than a second value representing the established distance, and wherein the determining the location data comprises determining that the mobile device is located on a connection point between the first device and the second device at a third distance away from the first device.

12. The method of claim 11, further comprising:
based on the location data, facilitating, by the system, an increase in a coverage of the communication network.

13. The method of claim 11, further comprising:
based on the location data, facilitating, by the system, an increase in a capacity of resources of the communication network.

14. The method of claim 11, wherein the determining the passive information comprises determining the first measurement data that represents a global positioning system measurement, and wherein the global positioning system measurement is determined to fall within the measurement window of time.

15. The method of claim 11, wherein the determining the passive information comprises receiving the passive information via a probe device that monitors communication data directed from the mobile device to an application server related to the application.

16. A non-transitory computer readable storage medium comprising executable instructions that when executed by a processor of a network device, facilitate performance of operations, comprising: based on timing data indicative of a timing interval during which a user equipment is determined to have moved from a first location to a second location, adjusting a measurement window of time along a time axis; determining passive information associated with a location of the user equipment, wherein the passive information comprises information that is transferred from the user equipment in response to a request from an application of the user equipment, wherein the passive information comprises first measurement data indicative of measurements associated with respective time stamps, and wherein the adjusting comprises adjusting the measurement window of time to comprise some of the measurements that satisfy a defined number criterion; based on the passive information, determining location data indicative of the location of the user equipment to facilitate management of a communication network that serves the user equipment, wherein the location is determined based on distance data indicative of a first distance between the user equipment and a first device of a first network and indicative of a second distance between the user equipment and a second device of a second network, wherein the location is further determined based on an established distance between the first device and the second device, and wherein a network communication of the user equipment is determined to be transferred from the first device to the second device; and verifying that a first value representing a sum of the first distance and the second distance equals a second value representing the established distance, and wherein the determining the location data comprises determining that the user equipment is located on a connection point between the first device and the second device.

17. The non-transitory computer readable storage medium of claim 16, wherein the location data is employable to increase a coverage of the communication network.

18. The non-transitory computer readable storage medium of claim 16, wherein the location data is employable to increase a capacity of the communication network.

19. The non-transitory computer readable storage medium of claim 16, wherein the measurement data, is indicative of a global positioning system measurement that falls within the measurement window of time.

20. The non-transitory computer readable storage medium of claim 16, wherein the determining the passive information comprises receiving the passive information via a probe device that monitors communication data directed from the user equipment to an application server related to the application.

* * * * *